(No Model.)
L. W. HURLBURT.
HANDLE FOR KNIVES OR FORKS.
No. 569,831. Patented Oct. 20, 1896.
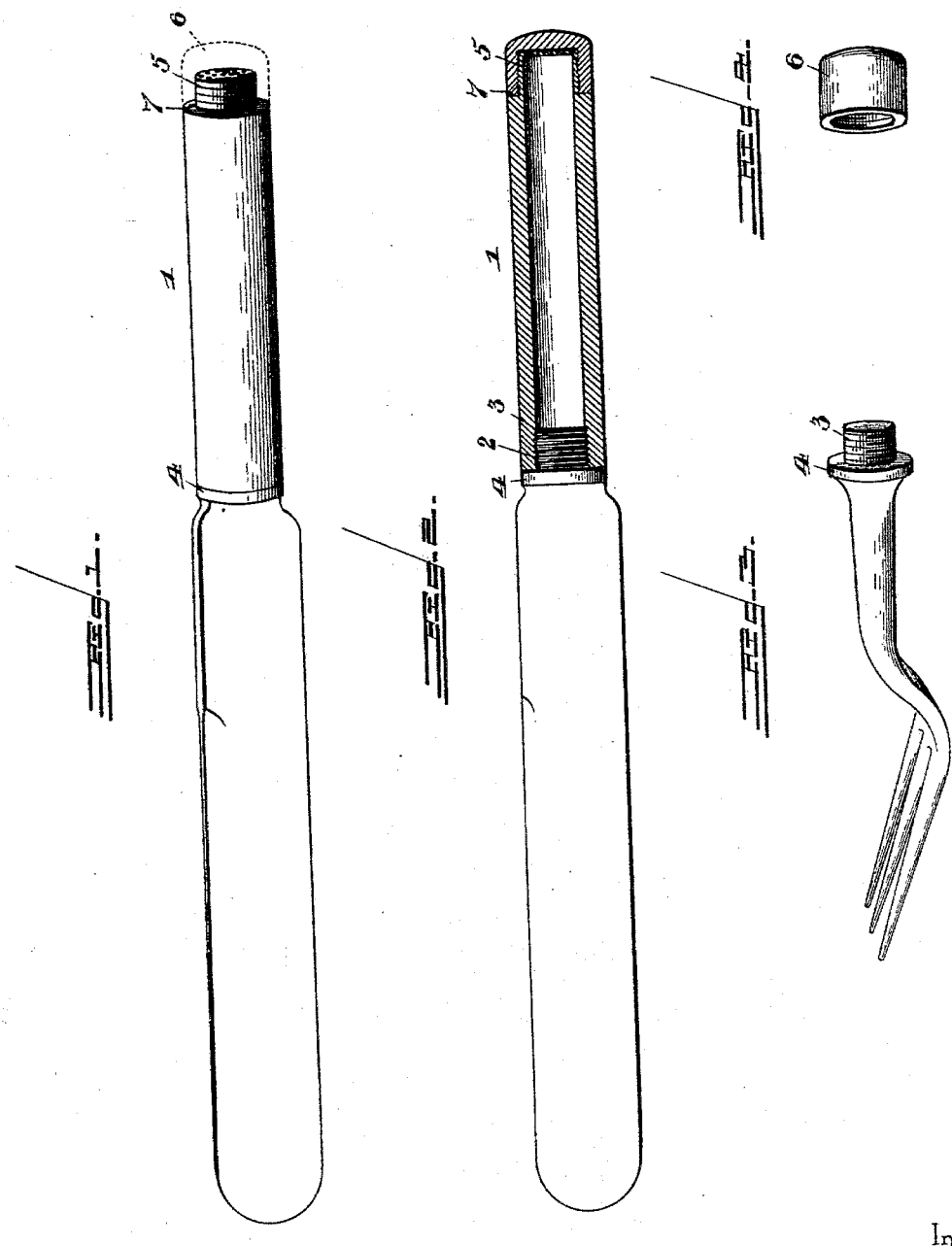
Witnesses
H. T. Doyle.
J. J. Riley
Inventor
Lansing W. Hurlburt
By his Attorneys,
C. A. Snow & Co.

UNITED STATES PATENT OFFICE.

LANSING W. HURLBURT, OF CRESTON, IOWA.

HANDLE FOR KNIVES OR FORKS.

SPECIFICATION forming part of Letters Patent No. 569,831, dated October 20, 1896.

Application filed February 20, 1896. Serial No. 580,024. (No model.)

*To all whom it may concern:*

Be it known that I, LANSING W. HURLBURT, a citizen of the United States, residing at Creston, in the county of Union and State of Iowa, have invented a new and useful Handle for Knives or Forks, of which the following is a specification.

The invention relates to improvements in handles for knives and forks.

The object of the present invention is to provide for knives and forks a simple and inexpensive handle adapted to form a condiment-receptacle and capable of affording ready access to the same to enable it to be quickly filled, and adapted to protect its contents effectually from water and the like when it is necessary to clean the knives and forks.

The invention consists in the construction and novel combination and arrangement of parts hereinafter fully described, illustrated in the accompanying drawings, and pointed out in the claim hereto appended.

In the drawings, Figure 1 is a perspective view of a handle constructed in accordance with this invention, the cap being removed. Fig. 2 is a longitudinal sectional view. Fig. 3 is a detail perspective view of the threaded shank. Fig. 4 is a detail perspective view of the removable cap.

Like numerals of reference designate corresponding parts in all the figures of the drawings.

1 designates a hollow handle forming a condiment-receptacle and designed especially for pepper and salt. The handle is adapted for knives and forks, as will be readily apparent from the accompanying drawings, and one is designed to contain pepper and the other salt, so that each person will have such seasoning within easy reach. The knives and forks may be made of any desired construction, and the hollow handle has its inner end 2 interiorly threaded and adapted to screw on a threaded shank 3 of the blade of a knife or the tines or prongs of a fork. It is readily removable therefrom to enable it to be conveniently and quickly supplied with pepper or salt. When the handle is arranged on the shank, its inner end fits against the annular shoulder 4, and a water-tight joint is effected to exclude water from the contents of the receptacle while the knives and forks are being washed.

The holder-handle is provided at its outer end with a reduced portion or extension 5, provided with perforations for the discharge of the contents of the receptacle. The perforations are covered, when it is not desired to use the contents of the receptacle, by a removable cap 6, interiorly threaded and screwed on the extension 5 of the outer end of the handle. The extension 5 is exteriorly threaded and the cap fits against the shoulder 7, formed by the reduction, and forms a continuation of the body of the handle and has its outer face flush with the same. The screw-cap forms a water-tight joint and excludes water from the contents of the receptacle.

Either a knife or fork handle may be employed for pepper or salt, and the perforations of the cylindrical extension 5 will be adapted for the contents of the receptacle, the perforations of the salt-receptacle being coarser or larger than those of the pepper-receptacle.

It will be seen that the handle for knives and forks is exceedingly simple and inexpensive in construction, that it provides an efficient condiment-receptacle, and that it will bring pepper and salt within convenient reach and will not interfere with the free use of the knives and forks. It will also be apparent that the condiment-receptacles may be readily filled when desired, and that the knives and forks may be freely washed without liability of water or the like employed in washing or cleaning entering the receptacles, and that it is unnecessary to remove the contents of the receptacles for the purpose of cleaning the knives and forks.

Changes in the form, proportion, and minor details of construction may be resorted to without departing from the spirit or sacrificing any of the advantages of this invention.

What I claim is—

The combination with the threaded shank of a knife or fork provided with an annular shoulder located at the inner end of the shank, a detachable hollow handle forming a condiment-receptacle and having its inner end interiorly threaded, arranged on said shank and abutting against said shoulder, said handle being provided at its outer end with a reduced cylindrical extension exteriorly threaded and provided with perforations, and an interiorly-threaded cap arranged on the threaded extension, forming a continuation of the handle and having its outer face flush with the outer face of the same, substantially as and for the purpose described.

In testimony that I claim the foregoing as my own I have hereto affixed my signature in the presence of two witnesses.

LANSING W. HURLBURT.

Witnesses:
J. L. BRADFORD,
E. O. STURTEVANT.